United States Patent
Laue et al.

(10) Patent No.: US 7,880,784 B2
(45) Date of Patent: Feb. 1, 2011

(54) ARRANGEMENT FOR GENERATING A 3D VIDEO SIGNAL

(75) Inventors: Burkhard Laue, Rellingen (DE); Nils Lahann, Pinneberg (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1540 days.

(21) Appl. No.: 10/548,743

(22) PCT Filed: Mar. 5, 2004

(86) PCT No.: PCT/IB2004/000680

§ 371 (c)(1),
(2), (4) Date: Sep. 9, 2005

(87) PCT Pub. No.: WO2004/082296

PCT Pub. Date: Sep. 23, 2004

(65) Prior Publication Data

US 2006/0187325 A1    Aug. 24, 2006

(30) Foreign Application Priority Data

Mar. 14, 2003    (EP) .................................. 03100653

(51) Int. Cl.
*H04N 15/00*    (2006.01)
*H04N 5/225*    (2006.01)

(52) U.S. Cl. ........................... 348/262; 348/42; 348/47; 348/45; 348/51

(58) Field of Classification Search ................. 348/42, 348/47, 45, 51, 262; 382/154
See application file for complete search history.

(56) References Cited

U.S. PATENT DOCUMENTS 5,682,437 A * 10/1997 Okino et al. ................. 382/100
6,445,833 B1 * 9/2002 Murata et al. ................ 382/285

* cited by examiner

*Primary Examiner*—Houshang Safaipour
(74) *Attorney, Agent, or Firm*—DLA Piper LLP (US)

(57) ABSTRACT

The invention relates to an arrangement for generating a 3D video signal, which produces a 3D effect when it is displayed on a screen, from an input video signal that is made up of frames, each of which has an odd field and an even field, where in order to generate the 3D video signal alternately an even field n and an odd field n−1 (or vice versa) and subsequently alternately an even field n+1 and an odd field n (or vice versa) are displayed, where in order to generate the 3D video signal a scan converter (4, 5) is used which can display two signals in the split screen mode, one of which is delayed by means of a special function memory (4) in the scan converter, where the non-delayed signal and the delayed signal are written, horizontally compressed by a factor of two, into a conversion memory (6) and, for the purposes of displaying on a screen, when they are read are scaled up by a factor of two in the horizontal direction.

4 Claims, 1 Drawing Sheet

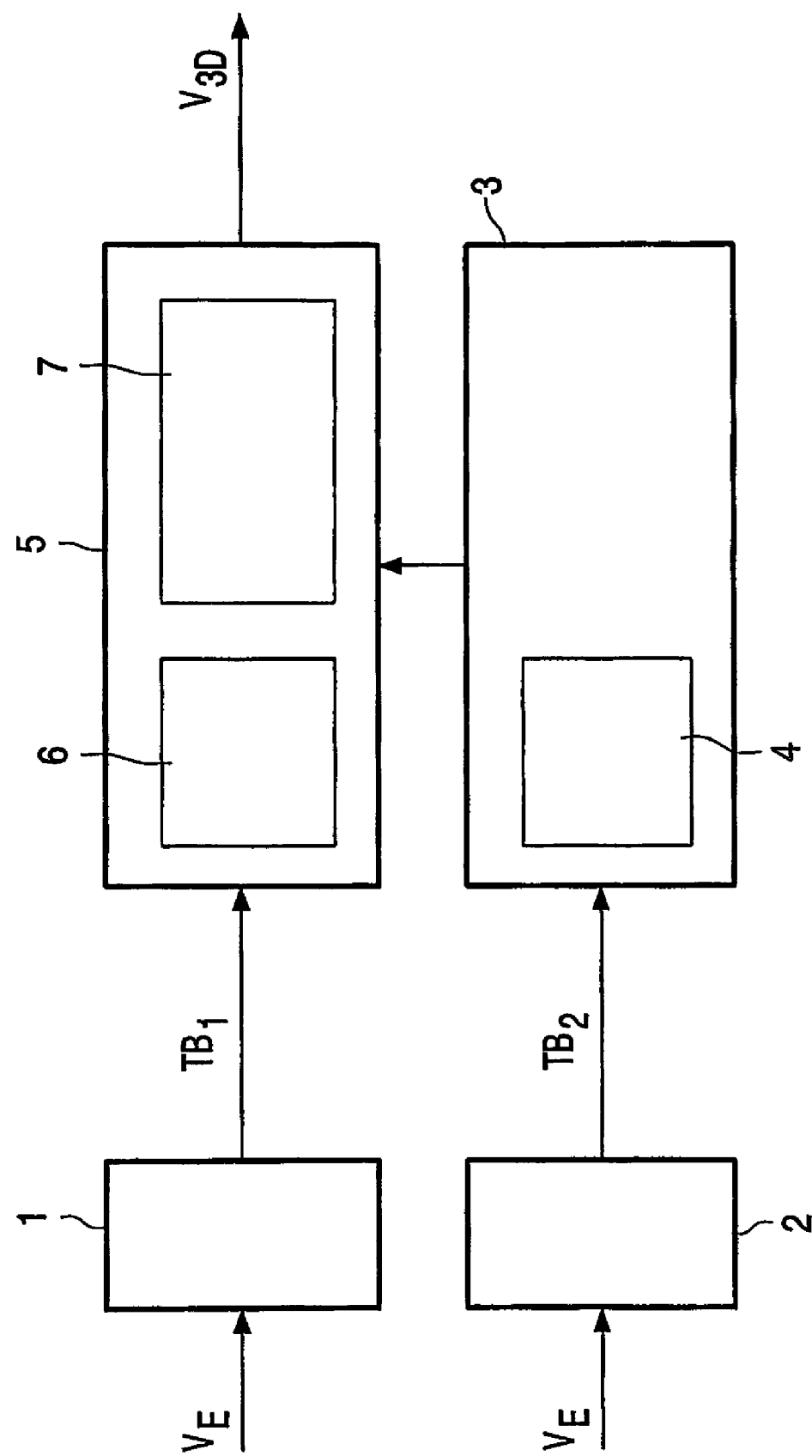

ARRANGEMENT FOR GENERATING A 3D VIDEO SIGNAL

The invention relates to an arrangement for generating a 3D video signal, which produces a 3D effect when it is displayed on a screen, from an input video signal that is made up of frames. Each frame has an odd field and an even field. In order to produce the 3D effect and to generate the 3D video signal, alternately an even field n and an odd field n−1 are displayed. Subsequently, the in each case next fields, that is to say an even field n+1 and an odd field n, are alternately displayed. Of course, this displaying can also take place in the inverse manner, that is to say for example an even field n−1 and an odd field n may alternate.

In the case of such an alternate displaying of two fields from two successive frames, the 3D effect is relatively clear, since moving objects that are located relatively close to the camera have a higher angular velocity than objects that are further away. As a result, moving objects are optically emphasized and a 3D effect is produced.

U.S. Pat. No. 5,682,437 discloses an arrangement which uses fields from two different frames to produce such a 3D effect.

The disadvantage of this and other known arrangements for producing a 3D effect in conventional 2D video signals is that in order to produce the 3D effect considerable additional hardware must be used, including at least some field memories.

It is an object of the invention to specify an arrangement of the type mentioned above which makes it possible, in respect of television sets comprising scan converters, to drastically reduce the complexity of producing the 3D video signal.

This object is achieved according to the invention by the features of patent claim 1:

An arrangement for generating a 3D video signal, which produces a 3D effect when it is displayed on a screen, from an input video signal that is made up of frames, each of which has an odd field and an even field, where in order to generate the 3D video signal alternately an odd field and an even field, which originate from two successive frames, and subsequently the identical fields of the in each case next frames are recorded in the 3D video signal, where in order to generate the 3D video signal a scan converter is used which can display two signals in the split screen mode, one of which is delayed by means of a special function memory in the scan converter, where the non-delayed signal and the delayed signal are written, horizontally compressed by a factor of two, into a conversion memory and, for the purposes of displaying on a screen, when they are read are scaled up by a factor of two in the horizontal direction and shifted horizontally such that they are displayed in the correct convergence.

Scan converters are in many cases provided in television sets in order to double or increase the field frequency. For example, a video signal having a field frequency of 50 Hz is converted into a video signal having a field frequency of 100 Hz. Such a 100 Hz scan converter for this purpose has a number of field memories and computing units.

The idea of the arrangement according to the invention is to use such a scan converter, as provided in any case in a large number of television sets, additionally to generate the 3D video signal or to produce the 3D effect in the video signal supplied by the scan converter on the output side. In particular, the field memories provided in any case in scan converters may be additionally used for the suitable intermediate storage of the fields for producing the 3D effect.

Scan converters that are able to display two signals in the so-called split screen mode have, by virtue of their architecture, all the means necessary to process two video signals independently of one another. They thus have two signal paths for processing two video signals. This property is used in the arrangement according to the invention to process the abovementioned field sequences separately from one another in the two paths.

Thus, the odd fields of the frames are processed in one path and the even fields of the frames are processed in the other path, and these are then displayed alternately on the output side in the manner described above. In a scan converter which can display two signals in the split screen mode, there is at least one memory provided for special functions, such as for movement estimation, time base correction or similar functions for example. One of the two field sequences is read field by field into this memory. This sequence of fields is thus delayed by a desired duration, usually by the duration of one frame. The other path of the scan converter processes in each case the other field sequence and reads the latter into a conversion memory. The field sequence read into the special function memory is read from said memory and likewise written into the same conversion memory. Thus the two field sequences are then present in the conversion memory, with one field sequence being delayed by a desired value relative to the other field sequence.

In scan converters provided to display two signals in the split screen mode, the conversion memory is configured such that the two signals are written into the conversion memory in a form scaled down, that is to say compressed, horizontally by a factor of 2. In the arrangement according to the invention, the two fields are read from the conversion memory again and scaled up in the horizontal direction by a factor of 2 so that both fields again exist in the normal size. The fields may then be displayed alternately in the manner described above, by being read in the appropriate sequence from the conversion memory.

The arrangement according to the invention uses all the hardware possibilities of a scan converter that can display two signals in the split screen mode. No additional hardware elements are required to generate the 3D video signal. The changes which need to be made to a scan converter in order to generate such a signal for implementing the arrangement according to the invention are limited to software changes.

According to two refinements of the invention as claimed in claims 2 and 3, the arrangement according to the invention has on the input side two multistandard digital decoders, of which one processes the odd fields and one processes the even fields.

Such multistandard decoders also have possibilities for scaling the image sequences processed by them.

As claimed in claim 2, that one of the two multistandard decoders which supplies the fields directly to the conversion memory is also used to perform such a horizontal scaling by a factor of 2, so that the fields supplied by this multistandard decoder are assigned to the conversion memory in a form already scaled down by a factor of 2. The other multistandard decoder, which processes the other field sequence, does not perform any such scaling down. This is carried out only when the data are read from the special function memory and then read into the conversion memory. This is readily possible at this point since scan converters have enough computing capacity to perform this scaling down.

Another advantageous possibility is that as claimed in claim 3, according to which the two multistandard decoders are in each case used to scale down by a factor of two the fields supplied by them. In this case, the fields are also written into the special function memory already in scaled-down form and then are transferred unchanged from this memory into the conversion memory.

In both solutions as claimed in claims 2 or 3 there is no additional hardware requirement since scan converters which are suitable for processing two video signals have two such multistandard digital decoders.

Besides generating the video signal with a 3D effect in the manner described above, the arrangement according to the invention may additionally be used to convert the input video signal having a field frequency of 50 Hertz into a 3D video signal having a field frequency of 100 Hertz. The abovementioned field sequences are doubled in the process; for example a field n, a field n−1, a field n and a field n−1 are displayed in this sequence. The respectively next fields are then likewise displayed twice alternately.

The invention will be further described with reference to examples of embodiments shown in the drawing to which, however, the invention is not restricted.

The single FIGURE shows, in the form of a block diagram, an arrangement according to the invention for generating a 3D video signal from a conventional input video signal.

The input video signal designated $V_E$ in the FIGURE may be a conventional video signal having a field frequency of 50 Hertz, for example of the PAL standard.

In the arrangement according to the invention, this signal is converted into a 3D video signal which is designated $V_{3D}$ in the FIGURE. The arrangement according to the invention additionally doubles the field frequency, so that the 3D video signal has a field frequency of 100 Hertz. The embodiments are 100 Hz scan converters. Scan converters producing another field frequency, for example 75 Hz, may also be used as desired.

The arrangement according to the invention on the input side has two digital multistandard color decoders 2 which on the output side supply in each case a field stream $TB_1$ and $TB_2$.

One of the digital multistandard color decoders in each case supplies the even fields and one the odd fields. In the text which follows, it will be assumed that the first digital multistandard color decoder supplies in the field sequence $TB_1$ the in each case odd fields of the input video signal $V_E$ and the second digital multistandard color decoder 2 supplies in its output field sequence $TB_2$ the in each case even fields of the input video signal $V_E$.

The arrangement has a 100 Hz scan converter which consists of circuit blocks 3 and 5 that are provided to generate a 100 Hertz signal. This 100 Hz scan converter may be provided for further purposes, such as movement estimation and movement correction, zooming of images, jitter correction or the like for example. 100 Hz scan converters which are provided to display two image signals in the split screen mode, in which two signals are displayed next to one another in horizontally offset form, have two signal paths for the independent processing of two signals. This property is used in the arrangement according to the invention to process the two field streams $TB_1$ and $TB_2$.

Furthermore, the memories provided in any case in the 100 Hz scan converter, which memories are designated 4 and 6 in the FIGURE, are likewise used to produce the 3D effect.

In the first circuit block 3 of the 100 Hz scan converter there is a memory 4 which is usually provided for special functions produced by means of the 100 Hz scan converter. The second field stream $TB_2$, which is supplied by the second digital multistandard color decoder 2, is read into this special function memory 4.

In the circuit block 5 of the 100 Hz scan converter there is a memory 6 which is used as conversion memory and into which 2 fields may be read such that they can be displayed in the above-described split screen mode during normal operation of the 100 Hz scan converter. In the arrangement according to the invention, this conversion memory 6 is also used to store two fields.

The first digital multistandard color decoder 1 supplies the field sequence $TB_1$ consisting of the odd fields of the frames, in a form that has already been scaled down, that is to say compressed, horizontally by a factor of 2. The fields are written into the conversion memory 6 in this scaled-down form.

The fields of the second field stream $TB_2$, which are initially stored uncompressed in the special function memory 4, are likewise scaled down, that is to say compressed, horizontally by a factor of 2 after they have been read from the memory 4 and before they are written into the conversion memory 6. Following this, in each case at least two fields are available in the conversion memory 6. Since the field stream 2 is delayed by the duration of one frame relative to the field stream 1, in each case an odd field of a frame n and an even field of a frame n−1 or n+1 are available in the conversion memory 6. In each case, there are then two fields in the conversion memory, said two fields belonging to successive frames, that is to say not to the same frame. On account of this selection of the fields, the above-described 3D effect is amplified since in this way movements which have occurred in the time that has lapsed between the fields are emphasized in an amplified manner.

The fields are now in the conversion memory 6 but still in compressed form, as is normally provided for the split screen mode. However, since the fields are to be displayed sequentially in full on the screen, the fields are scaled up again by a factor of 2 in the horizontal direction when they are read from the conversion memory 6. This may be effected by means of a further circuit block 7, which may normally be provided for example for display in the split screen mode. The images scaled up in this way are generated in correct convergence with respect to one another, that is to say in the same position. The video signal thus processed in supplied on the output side as a 3D video signal $V_{3D}$. At the same time a 100 Hz scan conversion can be performed so that the two fields stored in the conversion memory 6 alternately appear twice in the 3D video signal $V_{3D}$.

The arrangement according to the invention as shown in the FIGURE may also be configured such that not only the first digital multistandard color decoder 1 but also the second digital multistandard color decoder 2 performs a scaling down of the field stream $TB_2$ supplied to it. In this case, the fields read into the special function memory 4 are likewise read into this memory 4 in a form already scaled down horizontally by a factor of 2. There is then no need for the scaling down between the process of reading from the memory 4 and the process of reading into the conversion memory 6.

The arrangement according to the invention thus uses a 100 Hz scan converter to generate a 3D signal, where no hardware changes to the 100 Hz scan converter are necessary. Rather, the changes are limited to an appropriate software adaptation.

The invention claimed is:

1. An arrangement for generating a 3D video signal, which produces a 3D effect when it is displayed on a screen, from an input video signal that is made up of frames, each of which has an odd field and an even field, where in order to generate the 3D video signal a sequence of an odd field and an even field, each of which originate from a different one of two successive frames, and subsequently a sequence of a subsequent odd field and a subsequent even field, each of which originate from a different one of a next successive frame and a frame preceding the next successive frame, are provided in the 3D video signal, where in order to generate the 3D video signal a scan converter is used which can display two signals in a split screen mode, one of which is delayed by means of a special function memory in the scan converter, where the non-delayed signal and the delayed signal are written, horizontally compressed by a factor of two, into a conversion memory and, for the purposes of displaying on a screen, when they are read are scaled up by a factor of two in the horizontal direction and shifted horizontally such that they are displayed in the correct convergence.

2. An arrangement as claimed in claim 1, characterized in that the arrangement has on the input side two digital multi-standard color decoders, of which one supplies the odd (or even) fields to the special function memory and one supplies the even (or odd) fields to the conversion memory in a form that has already horizontally been scaled down by a factor of two, in that the fields are read from the special function memory, scaled down by a factor of two in the horizontal direction and written into the conversion memory.

3. An arrangement as claimed in claim 1, characterized in that the arrangement has on the input side two digital multi-standard color decoders, of which one supplies the odd (or even) fields to the special function memory in a form that has already horizontally been scaled down by a factor of two and one supplies the even (or odd) fields to the conversion memory in a form that has already horizontally been scaled down by a factor of two, in that the fields are read from the special function memory and written into the conversion memory.

4. An arrangement as claimed in claim 1, characterized in that the input video signal has a field frequency of 50 Hertz and in that the arrangement supplies on the output side the 3D video signal having a field frequency of 100 Hertz, where the displaying takes place according to the scheme field n, field n−1, field n, field n−1, field n+1, field n, field n+1, field n and so on.

* * * * *